Jan. 22, 1963 L. THEVENAZ 3,074,260
ACTUATING MECHANISM FOR THE FRICTION WHEEL
OF A PYROPHORIC LIGHTER
Filed Feb. 27, 1961 2 Sheets-Sheet 1

INVENTOR
LOUIS THEVENAZ
BY Irwin J. Thompson
ATTY.

Jan. 22, 1963   L. THEVENAZ   3,074,260
ACTUATING MECHANISM FOR THE FRICTION WHEEL
OF A PYROPHORIC LIGHTER
Filed Feb. 27, 1961                                    2 Sheets-Sheet 2

INVENTOR
LOUIS THEVENAZ
BY Irwin S. Thompson
ATTY.

3,074,260
ACTUATING MECHANISM FOR THE FRICTION WHEEL OF A PYROPHORIC LIGHTER
Louis Thevenaz, Les Rasses, Vaud, Switzerland, assignor to Thorens S.A., Sainte-Croix, Vaud, Switzerland, a corporation of Switzerland
Filed Feb. 27, 1961, Ser. No. 91,802
Claims priority, application Germany Mar. 4, 1960
5 Claims. (Cl. 67—7.1)

For any particular friction wheel and pyrophoric stone, the quality of the spark produced and consequently the lighting chances of the lighter depends upon the stroke and the peripheral speed of said friction wheel, as well as upon the pressure exerted on the stone. In the simplest systems the stroke and the peripheral speed of the friction wheel are directly controlled by the finger of the operator, acting on the friction wheel itself or on a rotative member rigidly coupled with the latter. In the more elaborate systems, the finger of the operator acting on an actuating member causes the rotation of the friction wheel through the intermediary of an assembly of levers or by a rack and a pinion. These devices are often designed in such a way that the initial effort required of the operator is high, then diminishes suddenly as a function of the stroke. One obtains thus an effect of acceleration which practically obliges the operator to make the friction wheel turn with a certain speed. However, said speed always depends more or less upon the ability of the operator and upon the movement that he communicates to the actuating member.

This is the reason for which numerous lighters present automatic devices intended to communicate to the friction wheel a stroke and a peripheral speed independent of the speed with which the operator actuates the actuating member. See for example Swiss Patent No. 283,162. These automatic devices are more delicate and sensitive to wear than the purely manually devices described before. The principal drawback is that their working security depends often to a very large extent upon the state of the friction wheel and upon the quality of the stone and the pressure exerted on said latter.

The object of the present invention is to bring together in a single mechanism the advantages of the automatic devices with the working security of the manually devices. This actuating device of the friction wheel comprises an automatic mechanism which communicates normally to the friction wheel a stroke and a speed independent of the way in which the operator controls the actuating member, the operator having, however, the possibility to impart to the friction wheel a speed higher than the speed that this automatic device would confer to it in actuating rapidly the actuating member. For this effect, the actuating mechanism of the friction wheel of a lighter with a pyrophoric stone comprises a member driving the friction wheel connected to it through a coupling having only one driving direction, as well as an actuating lever for said mechanism which is subjected to the action of a spring tending to maintain it in a rest position. The lighter of the present invention distinguishes from these known mechanisms by the fact that said actuating lever is connected to said driving member of the friction wheel through a toggle joint and by the fact that said actuating lever drives a tripping means for the toggle joint which normally brings said toggle joint from anyone of its two extreme positions defined by abutments past its unstable equilibrium position, from which a spring actuates said toggle joint until its other extreme position, this tripping means being however susceptible to drive the toggle joint in case of need until the proximity of either of its two extreme positions.

The annexed drawings show schematically and by way of example one embodiment of the mechanism according to the invention.

FIG. 1 is a view in cross-section of the mechanism in its normal or rest condition.

FIG. 1' is a similar view of the mechanism in its actuated condition.

Figure 1:
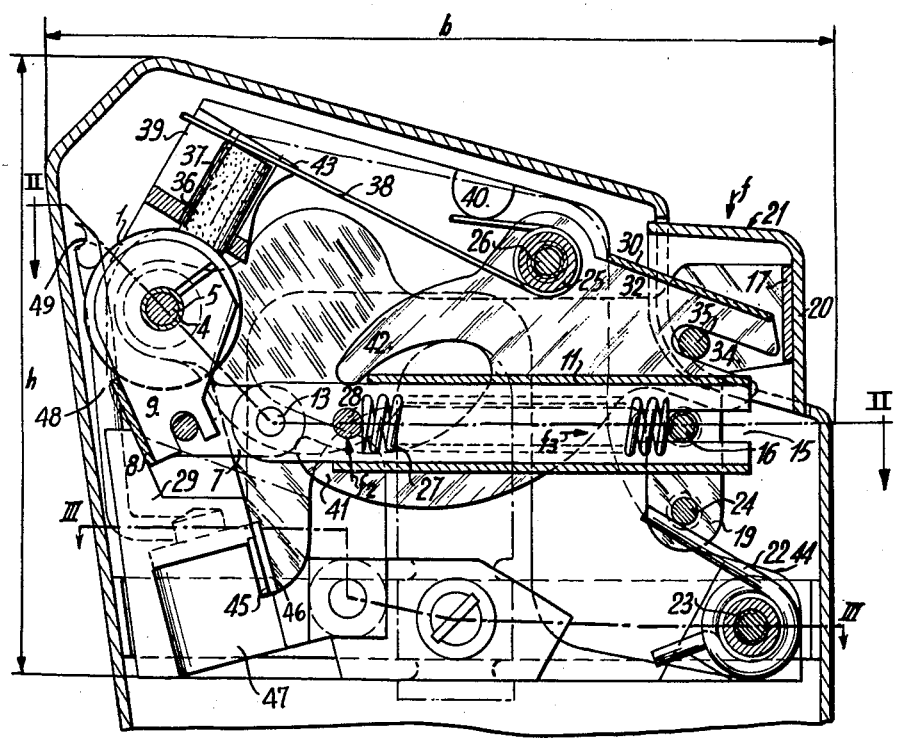
Figure 2:
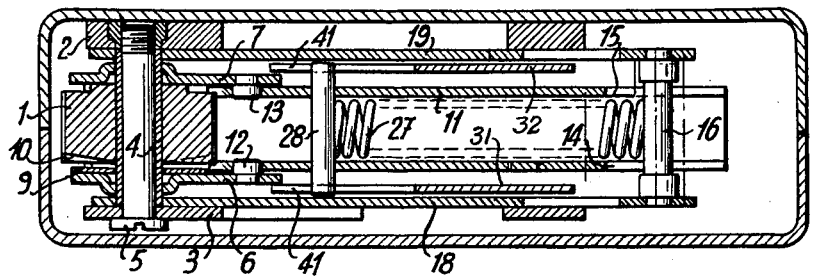
FIG. 2 is a view in cross-section along line II—II of FIG. 1.
Figure 1:
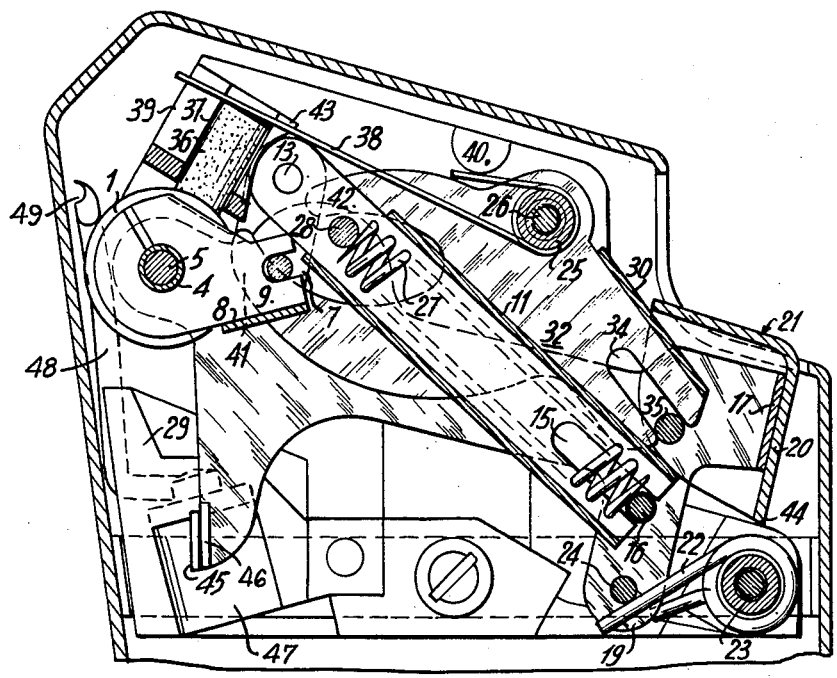
Figure 3:
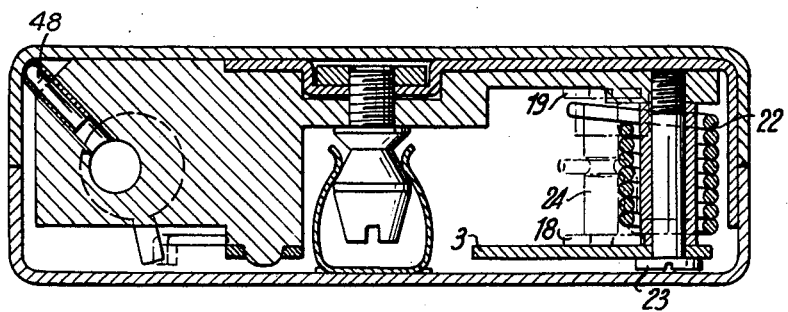
FIG. 3 is a view in cross-section along line III—III of FIG. 1.

The actuating mechanism of the friction wheel 1 is entirely lodged in a frame comprising a support 2 and a cover plate 3. The friction wheel 1 revolves freely on a tube 4 slipped over a bearing of the screw 5 retaining the cover plate 3 on the support 2. Said friction wheel is located between two arms 6 and 7 of a driving stirrup 8 pivoted freely on the tube 4 and mechanically connected to the friction wheel through a coupling having only one driving direction of a known type comprising a slotted elastic washer 9 driven in the angular displacements of the stirrup 8 and one of the lips of said slot co-operates with a front toothing 10 of the friction wheel 1.

A coupling rod 11 of rectangular cross-section is articulated on two cotters 12 and 13 respectively riveted on each of said arms 6 and 7 of the stirrup 8. At the opposite extremity, said coupling rod contains two slots 14 and 15, symmetrically provided on each of its lateral faces and in which slides and pivots a cotter 16 carried by a lever 17 formed by two parallel arms 18 and 19 located on either side of the coupling rod 11. The lever 17 carries at its rear extremity the actuating member 20 provided with a pushing face 21 and is freely pivoted through its fore extremity on the tube 4 on either side of the stirrup 8. A return spring 22 partially wound on a screw 23 retaining the cover plate 3 on the support 2 and bearing against a cotter 24 fixed between the arms 18 and 19 below the cotter 16, tends to maintain the lever 17 in its rest position as illustrated in full lines on FIG. 1 and which is defined by a pin 25 and a scerw 26 retaining the cover plate 3 on the support 2.

A coil spring 27 located in the inside of the coupling rod 11 bears on the cotter 16 and on a cotter 28 fast on the other extremity of said coupling rod. Under the influence of spring 27, the stirrup 8 occupies a rest position as shown in full lines on FIG. 1 and defined by an abutment 29 mounted on the support 2.

A lever 30, formed by two parallel arms 31 and 32 located on either side of the coupling rod 11 and between the arms 18 and 19 of the lever 17, pivots freely on the pin 25. The fore part of each of these arms has two fingers 41, 42 and thus takes the form of two forks symmetrically disposed on either side of the coupling rod 11. The rear part of each arm contains two symmetrical slots 33 and 34, in which a cotter 35 pivots and slides. The cotter 35 is connected with lever 17, in the inside of the actuating member 20. As will be explained hereinafter, the lever 30 serves as a tripping means for operating the toggle joint constituted by stirrup 8 and coupling rod 11.

A pyrophoric stone 36 slides in a housing 37 formed in the support 2. It is applied against the friction wheel 1 with a predeterminated pressure by a spring 38 partially wound on the pin 25 and the free extremity of which is engaged in a slot 39 of the support; the other extremity bears on the support at 40.

The described device works in the following manner:

When the user exerts a force $f$ on the face 21 of the actuating member 20, he initiates the pivoting of the lever 17 in the clockwise direction around the tube 4 and against the action of the return spring 22. The cotter 16 of said lever 17 co-operating with the slots 14 and 15 causes coupling rod 11 to pivot in the same direction around the cotters 12 and 13. Simultaneously the cotter 35 of the lever 17 cooperating with the slots 33 and 34 produces the pivoting of the lever 30 around pin 25 in the clockwise direction. The lever 30 serves to trip or operate the toggle joint, as follows.

As soon as the actuating member 20 has effected a stroke of a pre-determined amplitude, the lower fingers 41 of the fore extremities of the arms 31 and 32 of the lever 30 come in contact with the extremities of the cotter 28 which extend, on either side, beyond the lateral faces of the coupling rod 11. These fingers 41 exert then a push $f_2$ on the fore extremity of the coupling rod. Said coupling rod 11 thus pivots around the cotter 16 and drives the stirrup 8, which drives in its turn the friction wheel 1 through the intermediary of the coupling 9 which has only one driving direction.

During the first part of the displacement of the coupling rod 11, it is pushed back by the stirrup 8 in the direction of the arrow $f_3$ against the action of the spring 27 and slides on the cotter 16. As soon as the axis of cotter 13 passes the unstable equilibrium position, in which it is situated on a straight line connecting the axis 5 of the friction wheel 1 to the cotter 16, the spring 27 is free to expand and thus forces a rapid displacement of the stirrup 8 to the position illustrated in FIG. 1' and defined by an abutment 43 mounted on the support 2. This stirrup 8, the coupling rod 11 and the spring 27 constitute a toggle joint and work then in the manner of a tumbler switch.

The friction wheel is thus driven in a movement of rapid rotation independent of the slower movement normally communicated to the actuating member 20 by the operator, and a spark is produced. The actuating member comes at least to abut against the support 2 at 44.

In the case of a gas lighter, a finger 46 of the lever 17 may act on an arm 45 intended to produce simultaneously the opening of the valve 47 of a container (not shown) containing compressed gas. Said valve feeds a duct 48 feeding the gas to a burner 49.

When the operator releases the pressure exerted on the actuating member 20, the lever 17 pivots in the counter clockwise direction under the action of the return spring 22. The cotter 35 pivots the lever 30 around the pin 25 in the same direction. The upper fingers 42 of the fore extremities, in form of forks, of the arms 31 and 32 of said lever exert a push on the extremities of the cotter 28 producing thus the pivoting in the clockwise direction of the stirrup 8. Thanks to the coupling 9 having only one driving direction, the friction wheel is, this time, not driven into rotation. As soon as the position of alignment of the axes of parts 5, 13 and 16 is reached, the spring 27 causes the tipping of the coupling rod 11 and the sudden actuating of the stirrup 8 toward its rest position.

The lever 17 recovers then its rest position under the action of the spring 22.

The described device presents many advantages with respect to the known actuating mechanism of a friction wheel. As clearly shown in the drawing, the lever 17 presents a length approximately equal to the total length of the mechanism and consequently the length of the casing intended to contain said mechanism. For a given overall size the movement of the control member 20 approaches as near as possible to a rectilinear movement which ensures a very simple movement familiar to the great majority of the users of lighters. Furthermore, said disposition facilitates the realization of a casing of low overall sizes and of pleasant form.

Simultaneously, the attached drawing shows that this mechanism presents a small height $h$, for it extends on the whole width $b$ of the casing. Indeed, this mechanism presents an overall size which does not exceed that of the semi-automatic type mechanism equipping many lighters actually on the market. This mechanism also presents levers of great length which do not necessitate a high machining precision and the symmetric realization of which ensures the rigidity.

It is the presence of the tripping lever 30, particularly, which provides the benefit of all these advantages. With the aid of the two fingers in form of a fork, one may obtain a toggle joint working with a reduced control stroke in both directions. On the other hand, if for one reason or another the toggle joint loses its efficiency, the operator has always the possibility, in acting on the actuating member with an increased speed, to make the friction wheel turn at a sufficient speed to ensure in all cases the lighting. The non working of the toggle joint, that is, of the actuation of the stirrup by the spring 27, does not affect the working of the mechanism, which constitutes an important advantage of the described mechanism.

I claim:

1. A lighter comprising a frame, a friction wheel rotatably mounted upon said frame, a pyrophoric stone mounted on said frame and in contact with said friction wheel, a driving member for the friction wheel pivotally mounted on said frame, a one-way coupling mechanically connecting said driving member to said friction wheel, an actuating lever displaceably mounted on the frame, and an actuating mechanism for said driving member, first spring means acting on said actuating lever in order to maintain said actuating lever in a rest position, said actuating mechanism mechanically connecting said actuating lever to said one-way coupling and including a toggle joint, abutment means located on said frame on either side of an unstable equilibrium position of said toggle joint for stopping said toggle joint in each of two extreme positions, tripping means driven by said actuating lever for displacing the toggle joint from one or the other of said two extreme positions at least past said equilibrium position, and second spring means mounted in said toggle joint forcing said toggle joint from said unstable equilibrium position toward one or the other of said two extreme positions.

2. A lighter as claimed in claim 1, in which said driving member and one extremity of said actuating lever are pivoted coaxially with said friction wheel, and in which said frame carries said actuating mechanism.

3. A lighter as claimed in claim 2 in which said toggle joint includes a coupling rod, said driving member comprising a stirrup shaped piece, a first extremity of said coupling rod being hinged on said stirrup and its other extremity being hinged on the other extremity of said actuating lever, said second spring means tending to maintain said actuating mechanism in one of its two extreme positions.

4. A lighter as claimed in claim 3, in which said tripping means comprises a lever freely pivoted on said frame and having at least two spaced fingers, said coupling rod having a lateral extension disposed between said fingers, said fingers driving said coupling rod by means of said extension from either of its extreme positions at least past the unstable equilibrium position of said toggle joint, at which the pivoting axis of said stirrup and the two hinges of said coupling rod are located on a straight line.

5. A lighter as claimed in claim 4 in which said second spring means is mounted coaxially with said coupling rod, and in which an abutment is rigidly positioned within said coupling rod, said coupling rod has apertures located in opposite walls at its said other extremity, and a hinge pin rigidly connected to said actuating lever passes through said apertures, said second spring means bearing at one end upon said abutment and bearing at its other end upon said hinge pin, so that said coupling rod pivots and slides along said hinge pin.

References Cited in the file of this patent

UNITED STATES PATENTS 2,286,160    Richards _____ June 9, 1942

FOREIGN PATENTS 814,341    Germany _____ Sept. 20, 1951